(12) United States Patent
Kunert

(10) Patent No.: US 12,065,208 B2
(45) Date of Patent: Aug. 20, 2024

(54) HOLDING DEVICE FOR A COUNTER ELEMENT

(71) Applicant: Robert Bosch GmbH, Stuttgart (DE)

(72) Inventor: Peter Kunert, Lichtenstein (DE)

(73) Assignee: ROBERT BOSCH GMBH, Stuttgart (DE)

(*) Notice: Subject to any disclaimer, the term of this patent is extended or adjusted under 35 U.S.C. 154(b) by 365 days.

(21) Appl. No.: 17/612,909

(22) PCT Filed: Jul. 30, 2020

(86) PCT No.: PCT/EP2020/071550
§ 371 (c)(1),
(2) Date: Nov. 19, 2021

(87) PCT Pub. No.: WO2021/023625
PCT Pub. Date: Feb. 11, 2021

(65) Prior Publication Data
US 2022/0242513 A1 Aug. 4, 2022

(30) Foreign Application Priority Data
Aug. 2, 2019 (DE) ............... 10 2019 211 613.2

(51) Int. Cl.
*B62J 43/28* (2020.01)
*B62J 9/30* (2020.01)
(Continued)

(52) U.S. Cl.
CPC ............ *B62J 43/28* (2020.02); *B62J 9/30* (2020.02); *B62J 43/13* (2020.02); *B62M 6/90* (2013.01)

(58) Field of Classification Search
CPC ... B62M 6/90; B62J 43/13; B62J 43/28; B62J 43/20; B62J 43/23; B62J 43/10; B62J 9/30
See application file for complete search history.

(56) References Cited

U.S. PATENT DOCUMENTS 6,382,651 B1 * 5/2002 Enda .................. B62M 6/90
180/68.5
6,415,881 B1 * 7/2002 Tsai .................. B62K 3/002
180/68.5
(Continued)

FOREIGN PATENT DOCUMENTS

CN 1293125 A * 5/2001 ............ B62K 19/46
CN 1293125 A 5/2001
(Continued)

OTHER PUBLICATIONS

International Search Report for PCT/EP2020/071550, Issued Nov. 4, 2020.

*Primary Examiner* — Emma K Frick
(74) *Attorney, Agent, or Firm* — NORTON ROSE FULBRIGHT US LLP; Gerard A. Messina

(57) ABSTRACT

A holding device including at least one first tilting lever element rotatably mounted at a first pivotal point. This tilting element is connected to a spring element, which may be tensioned with a spring. The tilting lever element includes a first hook, which may be moved into a first position and a second position. In the first position, the first hook may engage, for holding or fixing, in a receptacle of the counter element. In the second position, the first hook releases the counter element again, so that it may be removed from the holding device. The first pivotal point of the mount of the tilting lever element is situated outside the axis of the spring. The spring of the spring element may be tensioned in one position and essentially untensioned in the other position.

20 Claims, 4 Drawing Sheets

(51) Int. Cl.
B62J 43/13 (2020.01)
B62M 6/90 (2010.01)

(56) References Cited

U.S. PATENT DOCUMENTS

| | | | | |
|---|---|---|---|---|
| 8,162,191 | B2 * | 4/2012 | Tetsuka | B62J 43/30 |
| | | | | 224/459 |
| 9,399,499 | B2 * | 7/2016 | Honda | B62M 6/90 |
| 11,101,516 | B2 * | 8/2021 | Shimoda | H01M 50/296 |
| 11,400,994 | B2 * | 8/2022 | Okabe | H01M 50/262 |
| 11,469,474 | B2 * | 10/2022 | Liu | H01M 50/262 |
| 2003/0168273 | A1 * | 9/2003 | Ducharme | B62M 6/75 |
| | | | | 180/181 |
| 2019/0165347 | A1 | 5/2019 | Trif et al. | |

FOREIGN PATENT DOCUMENTS

| | | | | | |
|---|---|---|---|---|---|
| CN | 101565069 | A | | 10/2009 | |
| CN | 201538223 | U | | 8/2010 | |
| CN | 102849170 | A | | 1/2013 | |
| CN | 112298421 | A | * | 2/2021 | ............ B62J 43/13 |
| DE | 9312687 | U1 | | 10/1993 | |
| DE | 102013218004 | A1 | | 3/2015 | |
| DE | 102015009091 | B3 | | 11/2016 | |
| DE | 102018006689 | A1 | | 2/2019 | |
| DE | 102019100673 | A1 | | 7/2019 | |
| DE | 202020005816 | U1 | * | 10/2022 | |
| EP | 3118096 | A1 | | 1/2017 | |
| FR | 2741585 | A1 | * | 5/1997 | ............ B62H 5/003 |
| JP | H08207877 | A | | 8/1996 | |
| JP | 2001106136 | A | * | 4/2001 | ............ B62K 19/36 |
| JP | 3289228 | B2 | | 6/2002 | |
| JP | 3386665 | B2 | | 3/2003 | |
| JP | 3289228 | B2 | * | 6/2022 | |
| WO | WO-2022179844 | A1 | * | 9/2022 | |

* cited by examiner

HOLDING DEVICE FOR A COUNTER ELEMENT

FIELD

The present invention relates to a holding device for holding a counter element, in particular, an energy store.

BACKGROUND INFORMATION

In many sectors, there is the desire to use releasable holders in order to temporarily connect two elements to one another or to lock a device in place at a holding device. In the use of rechargeable batteries in electrically drivable bicycles, in particular, a removal of the energy store attached, for example, at or in the frame is practical in order to be able to charge it offsite.

Common rechargeable batteries for electric bicycles are currently still fastened in a holding device at the frame of the bicycle. In this case, the installation of the holding device at the frame is easily possible even for a lay person, since the user has sufficient access to the frame from all sides. However, when housing a holding device of a rechargeable battery in the interior of the frame, as is increasingly provided in newer electric bicycles, the installation is somewhat more cumbersome even for an expert. The usual configuration of the holding device into two different elements, which hold or contact the rechargeable battery at the opposite longitudinal ends, also complicates the installation in the interior of the frame if no connecting element is provided in between them. In this case, the dimensions must be precisely noted, since the rechargeable battery could otherwise be set too loosely in the holding device due to tolerances if no other measures are adopted.

With the present invention, a simple holding device is provided, in which the releasable holding of a counter element, in particular, of an energy store, is necessary on only one side.

SUMMARY

The present invention provides a holding device for a counter element, as well as a two-wheeler that is equipped with such a holding device. An energy store or a rechargeable battery is cited as an example of such a counter element, which may be attached via a corresponding holding device according to the present invention in or at a frame of an at least partially electrically drivable bicycle. In addition, other containers or electrical devices such as entertainment electronics, household appliances or tools may, however, also be attached or held with the holding device according to the present invention.

The holding device according to an example embodiment of the present invention includes at least one tilting lever element rotatably mounted at a first pivotal point. This tilting element is connected to a spring element, which may be tensioned with the aid of a spring. The tilting lever element further includes a first hook, which may be moved into a first position and into a second position. In the first position, the first hook of the tilting element may engage, for holding or fixing, in a receptacle of the counter element, for example, in a counter-hook or a recess. In the second position, the first hook releases the counter element again so that it may be removed from the holding device. The design of the holding device is particularly inventive in that the first pivotal point of the mount of the tilting lever element is situated outside the axis of the spring. This specific arrangement of the spring element in relation to the pivotal point of the mount of the tilting lever element makes it possible for a change from the first position to the second position with the aid of a rotation of the tilting lever element to create a displacement of the spring axis from one side of the pivotal point to the other side. In the process, the spring of the spring element may be tensioned in one position and essentially untensioned in the other position.

The holding device in accordance with an example embodiment of the present invention makes it possible with lever mechanics implemented in this manner to enable the counter element to be held on one side at the holding device. Furthermore, the lever mechanics may be equipped via the choice of the spring with an adjustable elasticity which, in turn, may be adapted to the weight of the counter element or of the energy store. The tilting lever element also allows the counter element to be pulled toward the holding device.

One embodiment of the present invention is particularly advantageous, in which the spring is tensioned in the first position for holding the counter element. If, in addition, the counter element or its receptacle is designed accordingly, by inserting the counter element into the receptacle of the holding device, a change of the tilting element into the first position may be prevented by the tilting lever element being blocked in its rotational movement by the counter element. Thus, the pulling action, which otherwise without the counter element would affect the tilting element, will rotate the counter element into the second position.

In one refinement of the present invention, an actuation means (actuator) is provided, which upon actuation causes a rotation of the tilting lever element from the first position into the second position. This rotation is also associated with a displacement or a tipping of the spring axis. It may be optionally provided that the actuation of the actuation means must overcome a force in order to move the tilting lever element from the first position into the second position. The force necessary in this case may be determined in one embodiment essentially by the counterforce of the pulling action of the spring and/or of the weight of the counter element.

The tilting element may be designed in such a way that the first hook is provided on one side of the pivotal point and a lever element is provided on the other side as an attachment for a first stop of the actuation means.

In one further embodiment of the present invention, it is provided that the holding device includes two tilting elements, each of which is able to engage in a receptacle of the counter element. In this way, the pulling force of the first hook may be distributed to two areas. In this case, it is advantageous if the two tilting elements are situated at the edge of the holding device, so that the counter element is also protected by the holder against lateral tipping.

To hold or to lock or also to fix the counter element, it may be provided that a bolt element is also provided in the holding device. With the aid of this bolt element, an engagement in a locking element assigned to the counter element may be carried out. The holding, locking or fixing may thus also be made possible by this engagement. It is possible, for example, that the bolt element includes a second hook, which engages in a recess, for example, a hole of the locking element. The locking element or also the recess in this case may be provided directly at the counter element or may be installed at the latter via an add-on element.

The bolt element is preferably connected to an actuation means, in particular, to the same actuation means, which already acts on the lever element of the tilt lever for rotating or tipping the tipping element. The actuation of the actuation means in this case allows the bolt element to be released from the locking element, so that the counter element may be removed from the holding device. One possible embodiment of the actuation means involves the use of a push button.

To implement the actuation of the actuation means for releasing the counter element, it may be provided that the bolt element may be rotated around a second pivotal point. In this case, a second hook is provided on one side of the bolt element, which is able to engage in the locking element. The connection between the actuation means and the bolt element in this case is provided in such a way that by actuating the actuation means, a rotation of the bolt element around the second pivotal point takes place, which causes a retraction of the second hook from the recess of the locking element.

It may further be provided that the bolt element includes a guide element on a second side compared to the second hook, for example, in the form a pin-like embodiment. The second pivotal point in this case is provided between the second hook and the pin-like embodiment. It may optionally be provided that the guide element is guided in a guide channel in the interior or in the outer area of the actuation means.

The holding device may also be equipped with a lock and an associated lock pin. In this case, it is provided that the lock has a closed position and an open position, in which the lock pin is correspondingly moved to another position, for example, by a rotation or translational displacement. In the closed position, the lock pin is situated in such a way that it prevents an actuation of the actuation means from its initial position. This may be achieved by pushing the lock pin into the movement axis of the actuation means, so that a second stop of the actuation means impacts the lock pin and prevents a further movement.

It may optionally be provided that the holding device includes electrical contact means (electrical contact), with the aid of which an electrical connection to the counter element may be established in the first position of the tilting element. With such an embodiment, it is possible, in addition to the mechanical connection of the counter element to the holding device, to also achieve a mechanically and electrically permanent connection by the tensioning of the first hook and the counter-hook of the counter element or by the engagement of the second hook in the recess of the locking element.

When applying the holding device according to an example embodiment of the present invention for accommodating an electrical energy store or a rechargeable battery for a two-wheeler, for example, an electric bicycle, it may be provided to fasten the holding device in or at the frame. In this case, it is particularly useful to install the holding device in a tube of the frame so that the energy store is protected from external influences. With the one-sided design of the mechanical holder and, in particular, the electrical contacting, it is also possible to avoid an installation effort in the interior of the tube. The otherwise occurring manufacturing tolerances may also be disregarded. The fixing or holding of the energy store in the holding device is unaffected by its length, since no separate, opposite holding element has to be provided.

DETAILED DESCRIPTION OF EXAMPLE EMBODIMENTS

Figure 1:
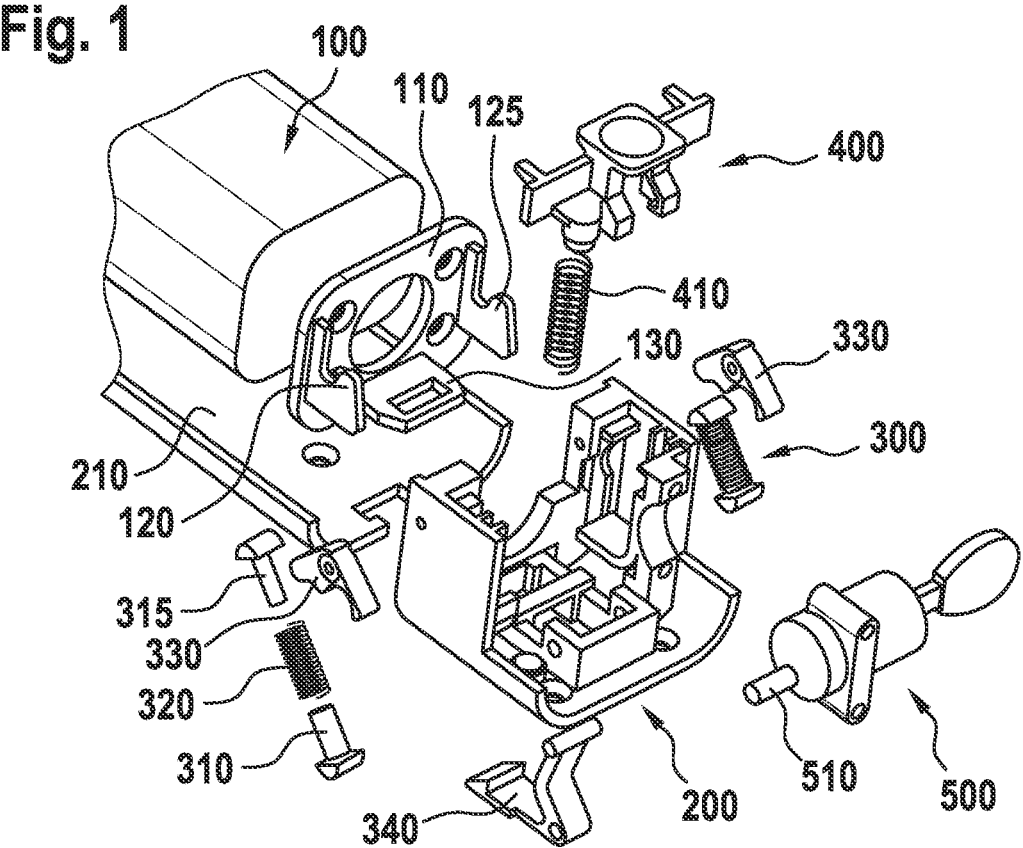
FIG. 1 shows the structure of one possible implementation of the present invention in an exploded-view.

The components used for implementing an example embodiment of the present invention are shown with reference to the exploded-view drawing of FIG. 1. This type of implementation represents only one of multiple possibilities.

FIG. 1 shows a holding device 200 for an energy store 100 or a rechargeable battery. Such holding devices may be widely used, for example, in electric bicycles, tools, household appliances or toys. However, the present invention is not to be limited to the holding of energy stores. Instead, a one-sided fastening option for a counter element, i.e., a general device, is to be provided with the present invention, without the need for a clamping from both sides. With the rotatable hook approach still to be described, the counter element in this case is pulled toward the holding device and jammed, in particular, by an additional bolt. The counter element is thus blocked against a removal. The spring connected to the hook allows for both an additional jamming or tensioning between the hook and the counter element as well as a resetting of the rotatably mounted hook of the holding device.

Holding device 200 according to FIG. 1 may also include a guide rail 210, which is connected in the lower area to holding device 200 and energy store 100 may be placed thereon. For the present invention, however, this guide rail is not initially essential; however, when inserting holding device 200 into the interior of a tube of a bicycle frame, it may prevent energy store 100 from resting directly on the tube. In this case, it is also possible that damping elements or tightness precautions are taken with the guide rail in order to protect the energy store against moisture. Holding device 200, as it is depicted in the exploded-view drawing of FIG. 1, includes two laterally situated tilting elements 330 and one spring element 300 each connected to this tilting element 330. Alternatively, it may also be provided that only one tilting element 330 including spring element 300 is provided in the holding device, for example, situated in the middle or centrally on the surface to energy store 100. Spring element 300 in this case may be made of a spring 320, which is enclosed by two parts 310 and 315 of spring element 300. To be able to tension spring 320, these two parts 310 and 315 may be provided to be movable relative to one another. The spring element is equipped with a first hook 332 (for this detail, see FIG. 2A), which engages in a corresponding counter-hook 120. This counter-hook 120 may be provided at energy store 100 or at a fastening element 110 attached to energy store 100. Counter-hook 120 may be provided separately, for example, centered in the middle at the end face of the energy store. Alternatively, however, it may also be provided that two counter-hooks 120 and 125 are provided laterally on energy store 100, as is apparent from FIG. 1. Such a double design may result in an even greater force-fit locking, which also reduces a twisting in the direction of the vertical axis. Further provided in holding device 200 is an actuation means (actuator) 400, which may be actuated from above in holding device 200. To enable actuation means 400 to be reset, a spring 410 is provided which is situated below actuation means 400. For a further locking or force-fit connection of energy store 100 and holding device 200, a bolt element 340 may be provided. This bolt element may include a second hook 342 or a pin, which is able to engage in a corresponding receptacle of a locking element 130 of fastening element 110. In one simple embodiment, the receptacle in this case represents an opening, for example, a hole, in which second hook 342 or the pin engages and thus prevents an, in particular, lateral removal of the energy store. In order to additionally inhibit the removal of energy store 100, a lock 500 including a lock pin 510 may be provided, which is able to prevent the movement of actuation means 400 and thus an unlocking.

Figure 2A:
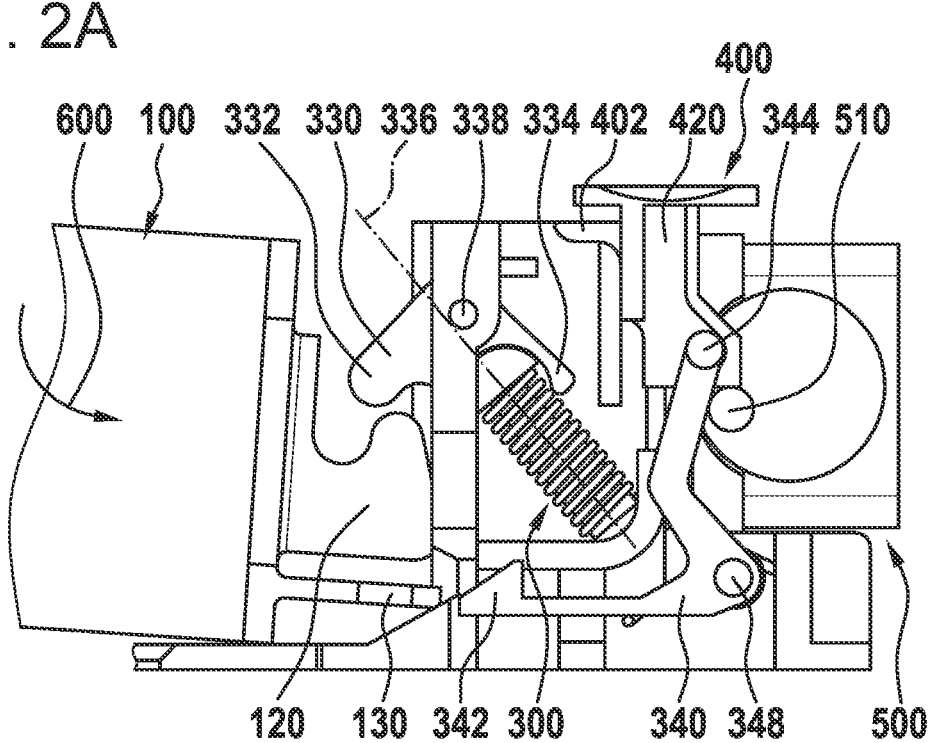
FIGS. 2A through 2C show the insertion of a counter element in the form of an energy store into the holding device according to an example embodiment of the present invention.
Figure 2B:
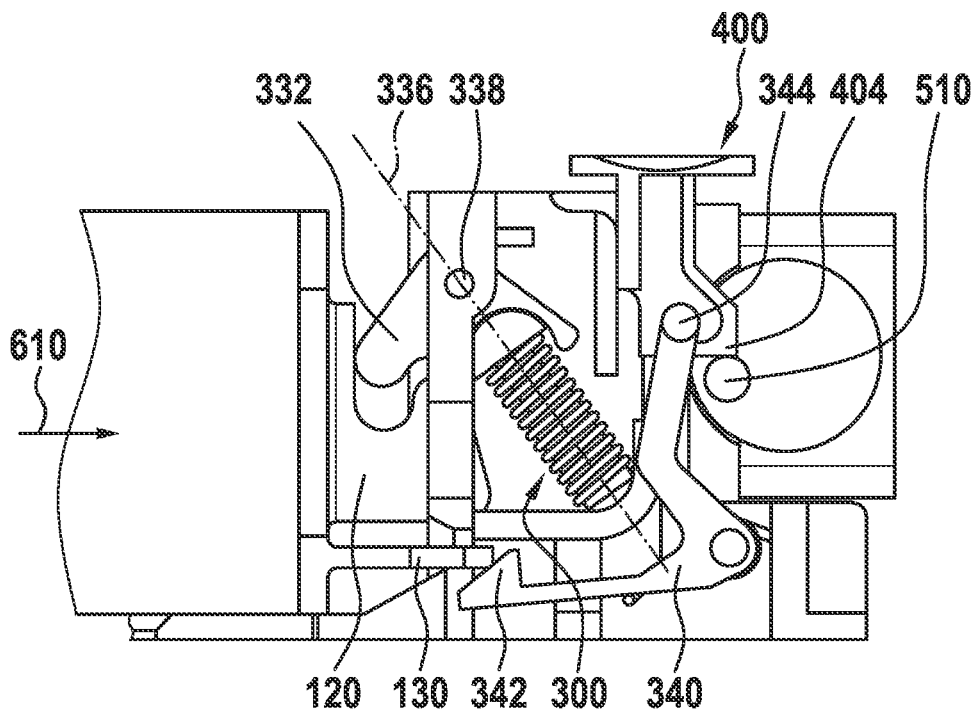
Figure 2C:
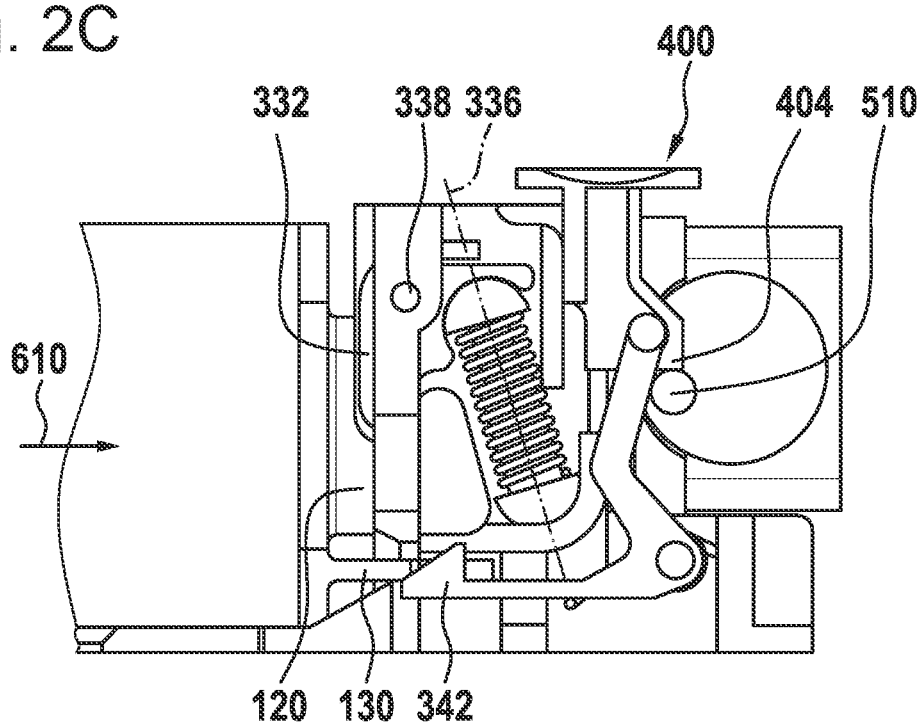

The operating mode of the present invention is explained by way of example with reference to FIGS. 2A through 2C as well as 3A and 3B. In this respect, an insertion of energy store 100 into holding device 200 with subsequent latching or locking is described in FIGS. 2A through 2C, whereas FIGS. 3A and 3B describe the process during removal.

Compared with the exploded-view drawing of FIG. 1, details are shown in FIG. 2A, with the aid of which the present invention may be implemented. Of significance in this case is that tilting lever element 330 is rotatably mounted at a first pivotal point 338. Spring 320 connected to tilting lever element 330 is situated initially untensioned in the initial position in such a way that its spring axis 336 is situated below first pivotal point 338. In addition to the above-mentioned first hook 332 on one side of pivotal point 338, tilting lever element 330 further includes a lever element 334 on the other side of pivotal point 338. This lever element 334 will become relevant below for pushing back tensioned spring 320 and pushing out energy store 100. First hook 332 is designed in such a way that, after energy store 100 is inserted into holding device 200, it is able to engage in corresponding counter-hook 120 or 125 of energy store 100, for example in the form of a rotational movement 600. Furthermore, bolt element 340 is provided with a second hook 342, which is configured to engage in a corresponding receptacle or opening of locking element 130, in order to also lock energy store 100 in holding device 200. Bolt element 340 in this case is rotatably mounted at a second pivotal point 348, so that second hook 342 may be moved in a rotational movement into, or rotated out of, the receptacle or opening. On the other side of second pivotal point 348, bolt element 340 includes a guide element 344, which is connected, for example, to an actuation means 400. This actuation means 400, for example a push button, is provided for the purpose of guiding guide element 344 and thus to rotate second hook 342 of bolt element 340. The guiding in this case may take place in such a way that guide element 344 is guided in a guide channel 420 of actuation means 400. Actuation means 400 further includes a first stop 402 which, when actuated, is able to act on lever element 334 of tilting lever element 330. To safeguard actuation means 400 against an unintended actuation, a lock 500 including a lock pin 510 may be provided. Lock pin 510 is used in this case as a blockade for the movement or actuation of actuation means 400, for example, in that actuation means includes a second stop 404, which sets on lock pin 510 in the closed state of lock 500.

FIG. 2B shows the relationships of the individual elements after the insertion of energy store 100 in first axial displacement 610 in the direction of holding device 200. As a result of this axial insertion of energy store 100, first hook 332 is pressed into counter-hook 120 or 125 of energy store 100. At the same time, tilting lever element 330 is rotated around first pivotal point 338, so that spring 320, which rests on a corresponding receptacle in the area of lever element 334, is moved in such a way that spring axis 336 is changed.

Simultaneously as a result of this movement, the spring is by inserting energy store 100 into holding device 200, bolt element 340 is also activated, when second hook 342 is pressed downwardly by the inserted locking element 130 and thus triggers a rotational movement of bolt element 340 around second pivotal point 348 until second hook 342 is able to engage in the receptacle or opening of locking element 130.

The end state of the insertion of energy store 100 into holding device 200 is depicted in FIG. 2C. First hook 332 engages in counter-hook 120 or 125, while second hook 342 in locking element 130 completes the locking of energy sore 100. As a result of the rotation of tilting lever element 330, a change of direction of spring axis 336 takes place in such a way that in the locked state, it is situated above first pivotal point 338. At the same time, spring 320 is tensioned as a result of the rotation. An actuation of actuation means 400 is prevented by lock pin 510 in this position of lock 500, since the movement thereof is prevented by the impact of second stop 404 on lock pin 510.

Figure 3A:
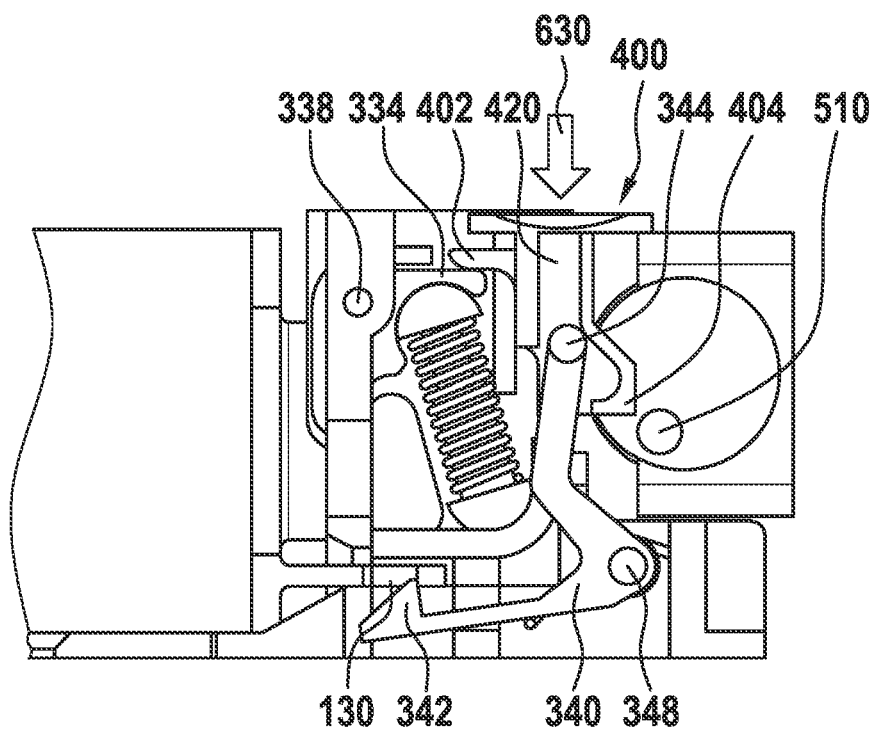
FIGS. 3A and 3B show the removal according to an example embodiment of the present invention.
Figure 3B:
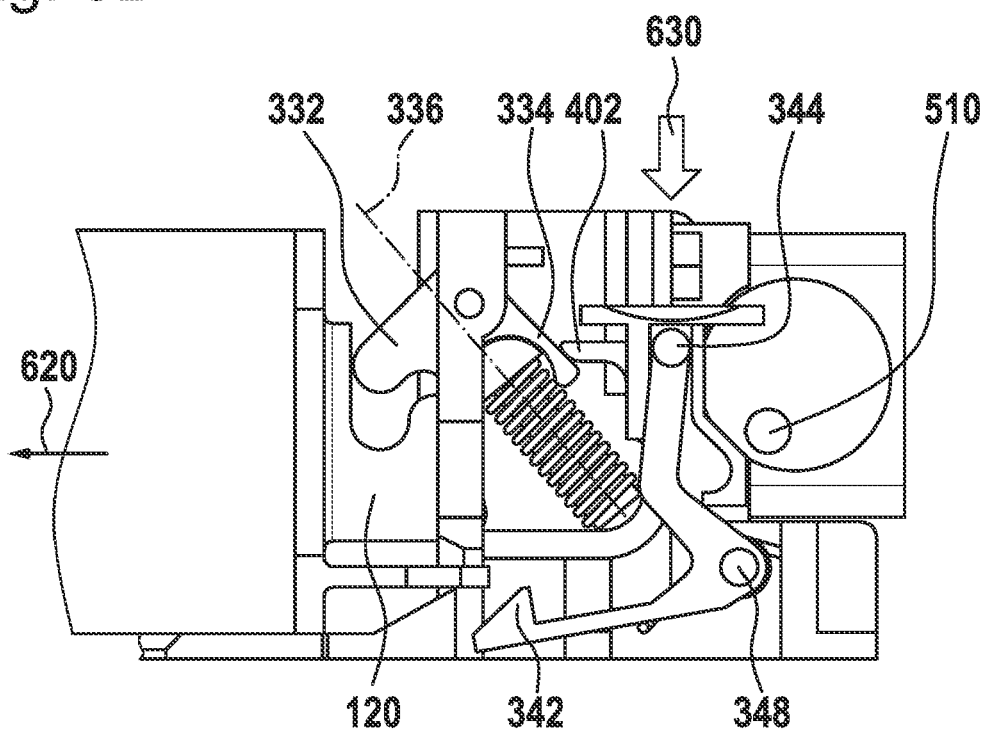

Starting from the latched and locked state of energy store 100 in holding device 200 according to FIG. 2C, the removal of the energy store is discussed below with reference to FIGS. 3A and 3B. Lock 500 is initially actuated in such a way that lock pin 510 no longer blocks the movement of actuation means 400. An actuation of actuation means is provided in this case from above 6300 in FIG. 3A, alternatively, a corresponding design of actuation means 400 for actuation from the side or from below may, however, also be provided. As a result of the actuation of actuation means 400, guide element 344 is moved in guide channel 420 in such a way that a rotational movement of bolt element 340 is initiated around second pivotal point 348. The result of this rotational movement is that second hook 342 is moved out of the receptacle or opening of locking element 130. In addition, as a result of the actuation of actuation means 400, first stop 402 is pressed onto lever element 334, as a result of which tilting lever element 340 is rotated. This rotation causes first hook to push energy store 100 in axial direction 620 away from the holding device. In the process, the force, which for pushing out energy store 100 is supported by the retraction of tensioned spring 320, so that when actuating actuation means 400, the user is required to only initially exert a pushing force. As a result of the actuation of actuation means 400, spring axis 336 after the removal process is again located in the original initial position below first pivotal point 338.

Figure 4:
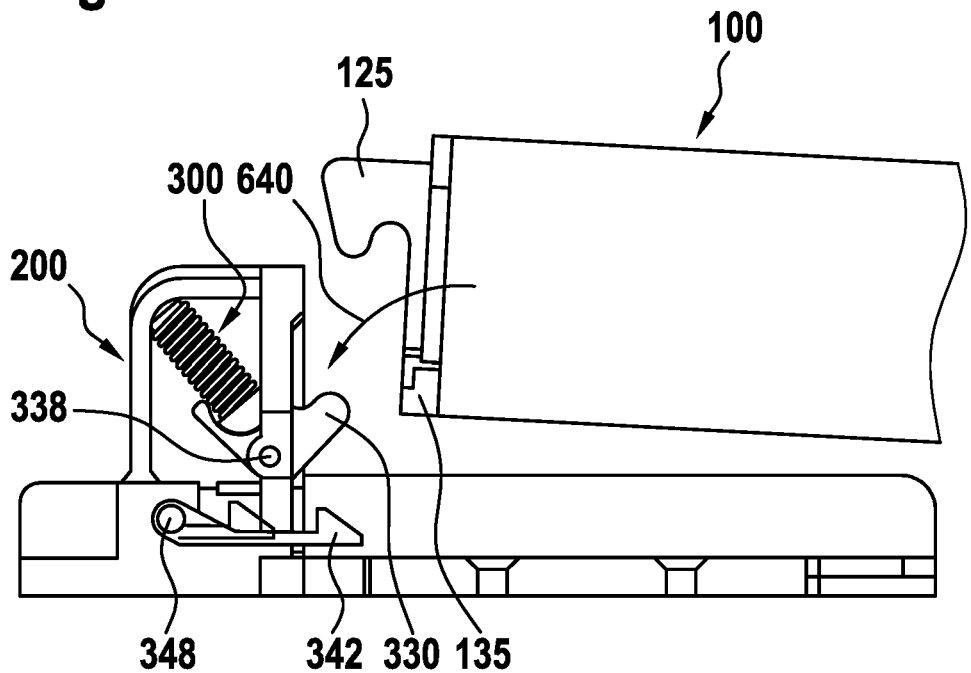
FIG. 4 shows one variant of the present invention.

In one alternative embodiment, it may be provided that the spring arrangement of tilting lever element 330 is rotated, as is represented in FIG. 4. In this case, energy store 100 including its counter-hook 125 could be inserted from above into holding device 200. This may also take place with a rotational movement 640 or with a vertical movement downward. In this embodiment, it is possible that energy store 100 includes a receptacle 135 for engaging second hook 342 of bolt element 340.

Figure 5:
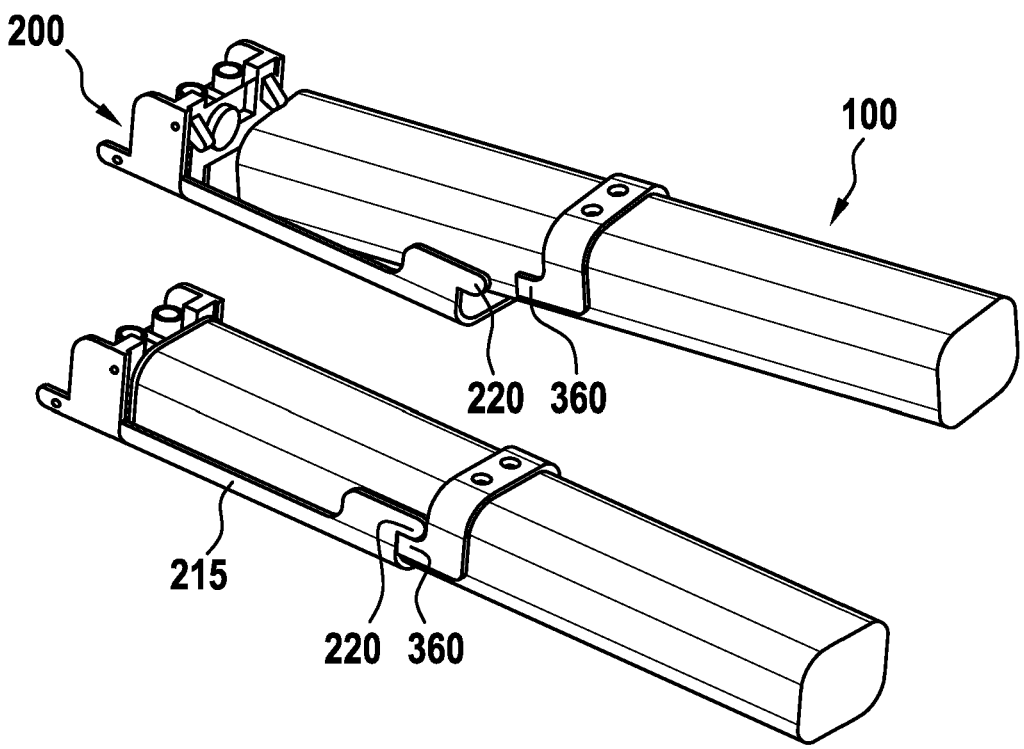
FIG. 5 shows a further possibility for locking the energy store at the holding device, in accordance with an example embodiment of the present invention.

One further possibility of mechanically holding energy store 100 with hooks at holding device 200 or at a guide rail 215 connected to holding device 200 is represented in FIG. 5. In this case, guide rail 215 includes at least one hook 220 or an undercut, into which a corresponding counter-hook 360 of energy store 100 may be axially inserted. This attachment enables an axial introduction of energy store 100 into holding device 200, a vertical removal being blocked.

What is claimed is:

1. An at least partially electrically driven bicycle, comprising:
a holding device for a counter element, the counter element being an energy store, the holding device including:
at least one first rotatably mounted tilting lever element; and
a spring element including a spring connected to the first tilting lever element;
wherein the first tilting lever element includes one first hook, which engages in a first position for holding the counter element in a receptacle of the counter element, the receptacle being a counter-hook, and which, in a second position, releases the counter element for removal, a first pivotal point of a mount of the first tilting lever element being situated outside a spring axis of the spring,
wherein a change from the first position to the second position causes a rotation of the tilting lever element and a displacement of the spring axis from one side of the first pivotal point to the other side of the first pivotal point,
wherein the spring is tensioned in one position and is essentially untensioned in a corresponding other position, and
wherein the spring element is untensioned in an initial position so that the spring axis is situated below the first pivotal point.

2. The bicycle as recited in claim 1, wherein the holding device includes a bolt element to engage in a locking element assigned to the counter element, and wherein a locking of the counter element in the holding device occurs as a result of the engagement.

3. The bicycle as recited in claim 2, wherein the bolt element is connected to an actuator, an actuation of the actuator causing a separation from the locking element and a release of the counter element for removal from the holding device.

4. The bicycle as recited in claim 3, wherein the holding device includes a lock including a lock pin, the lock pin being capable of assuming a closed position and an open position, and in the closed position, prevents the actuation of the actuator, when a second stop of the actuator impacts the lock pin.

5. The bicycle as recited in claim 2, wherein the bolt element is rotatably mounted around a pivotal point and includes a second hook for engaging in the locking element, the actuation of the actuator causing a rotation of the bolt element.

6. The bicycle as recited in claim 5, wherein the second hook of the bolt element is situated on one side of the bolt element, and a second side of the bolt element has a pin-like embodiment, a second pivotal point of the bolt element being situated between the first side and the second side, a connection of the bolt element and the actuator taking place via the pin-like embodiment, the pin-like embodiment being a guide element which is guided in a guide channel of the actuator.

7. A holding device for a counter element, comprising:
at least one first rotatably mounted tilting lever element; and
a spring element including a spring connected to the first tilting lever element;
wherein the first tilting lever element includes one first hook, which engages in a first position for holding the counter element in a receptacle of the counter element, the receptacle being a counter-hook, and which, in a second position, releases the counter element for removal, a first pivotal point of a mount of the first tilting lever element being situated outside a spring axis of the spring,
wherein a change from the first position to the second position causes a rotation of the tilting lever element and a displacement of the spring axis from one side of the first pivotal point to the other side of the first pivotal point,
wherein the spring is tensioned in one position and is essentially untensioned in a corresponding other position, and
wherein the holding device includes a bolt element configured to engage in a locking element assigned to the counter element, and wherein a locking of the counter element in the holding device occurs as a result of the engagement.

8. The holding device as recited in claim 7, wherein the bolt element is connected to an actuator, an actuation of the actuator causing a separation from the locking element and a release of the counter element for removal from the holding device.

9. The holding device as recited in claim 8, wherein the holding device includes a lock including a lock pin, the lock pin being capable of assuming a closed position and an open position, and in the closed position, prevents the actuation of the actuator, when a second stop of the actuator impacts the lock pin.

10. The holding device as recited in claim 7, wherein the bolt element is rotatably mounted around a pivotal point and includes a second hook for engaging in the locking element, the actuation of the actuator causing a rotation of the bolt element.

11. The holding device as recited in claim 10, wherein the second hook of the bolt element is situated on one side of the bolt element, and a second side of the bolt element has a pin-like embodiment, a second pivotal point of the bolt element being situated between the first side and the second side, a connection of the bolt element and the actuator taking place via the pin-like embodiment, the pin-like embodiment being a guide element which is guided in a guide channel of the actuator.

12. A holding device for a counter element, comprising:
at least one first rotatably mounted tilting lever element; and
a spring element including a spring connected to the first tilting lever element;
wherein the first tilting lever element includes one first hook, which engages in a first position for holding the counter element in a receptacle of the counter element, the receptacle being a counter-hook, and which, in a second position, releases the counter element for removal, a first pivotal point of a mount of the first tilting lever element being situated outside a spring axis of the spring,
wherein a change from the first position to the second position causes a rotation of the tilting lever element and a displacement of the spring axis from one side of the first pivotal point to the other side of the first pivotal point, wherein the spring is tensioned in one position and is essentially untensioned in a corresponding other position, and wherein the spring element is untensioned in an initial position so that the spring axis is situated below the first pivotal point.

13. The holding device as recited in claim 12, wherein the counter element is an energy store.

14. The holding device as recited in claim 12, wherein the spring is tensioned in the first position for holding the counter element, it being provided that in the first position, the first tilting lever element rests on the counter element and a pulling action of the tensioned spring is thus blocked.

15. The holding device as recited in claim 12, further comprising:

an actuator which, when actuated, causes a rotation of the first tilting lever element from the first position into the second potion and the displacement of the spring axis, the actuation of the actuator requiring a counterforce predefined by the spring.

16. The holding device as recited in claim 15, wherein the first hook is situated on one side of the first tilting lever element and a lever element is situated on a second side of the first tilting lever element as an attachment for a first stop of the actuator, the first pivotal point of the first tilting lever element being situated between the first side and the second side.

17. The holding device as recited in claim 12, wherein the at least one first tilting lever element includes two tilting lever elements, which are attached laterally in the holding device.

18. The holding device as recited in claim 12, wherein the holding device includes electrical contact via which the counter element is electrically contacted in the first position of the first tilting lever element, and wherein the counter element is an energy store.

19. The holding device as recited in claim 12, wherein the holding device is configured to be attached in or at a frame of an electric bicycle.

20. The holding device as recited in claim 19, wherein the holding device is configured to be housed within a frame tube of the electric bicycle.

* * * * *